United States Patent [19]

Halpern

[11] 4,123,767
[45] Oct. 31, 1978

[54] CAMERA AND FILM IDENTIFICATION SYSTEM

[76] Inventor: Neil S. Halpern, 6437 Todd Ct., Cornwells Heights, Pa. 19020

[21] Appl. No.: 632,385

[22] Filed: Nov. 17, 1975

[51] Int. Cl.² ........................................... G03B 17/24
[52] U.S. Cl. ....................................... 354/107; 355/40
[58] Field of Search ............... 354/105, 106, 107, 108, 354/109; 352/92; 355/40

[56] References Cited

U.S. PATENT DOCUMENTS

| | | | |
|---|---|---|---|
| 2,226,364 | 12/1940 | Anthony | 354/107 |
| 2,516,718 | 7/1950 | Oriol | 352/92 |
| 2,602,369 | 7/1952 | Tuttle | 354/107 |
| 3,463,064 | 8/1969 | Klingenstein | 354/107 |
| 3,739,697 | 6/1973 | Miyagawa | 354/108 |
| 3,783,763 | 1/1974 | Whitley | 354/108 |
| 3,831,183 | 8/1974 | Miyagawa | 354/109 |
| 3,843,956 | 10/1974 | Kauneckas | 354/108 |
| 3,906,523 | 9/1975 | Ogiso et al. | 354/109 |
| 3,971,049 | 7/1976 | Ohmori et al. | 354/105 |

*Primary Examiner*—L. T. Hix
*Assistant Examiner*—Alan Mathews
*Attorney, Agent, or Firm*—Kenneth P. Synnestvedt

[57] ABSTRACT

A system is disclosed for identifying films exposed in individual cameras. Each camera is provided with an internal enclosed chamber one wall of which is positioned adjacent to the film in the exposure zone and is formed at least in part of transparent material and carries individual identifying indicia for that camera. An electric lamp is positioned within the enclosed chamber and means are provided for energizing the lamp each time an exposure is made.

4 Claims, 7 Drawing Figures

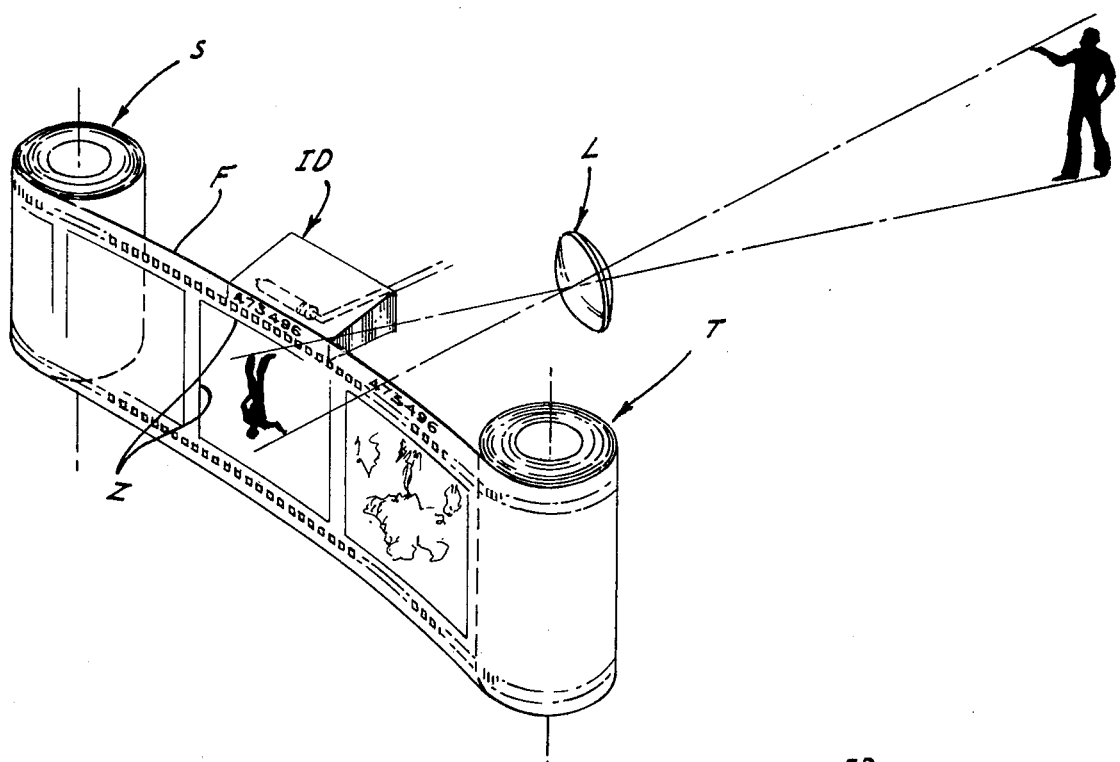
FIG. 1.
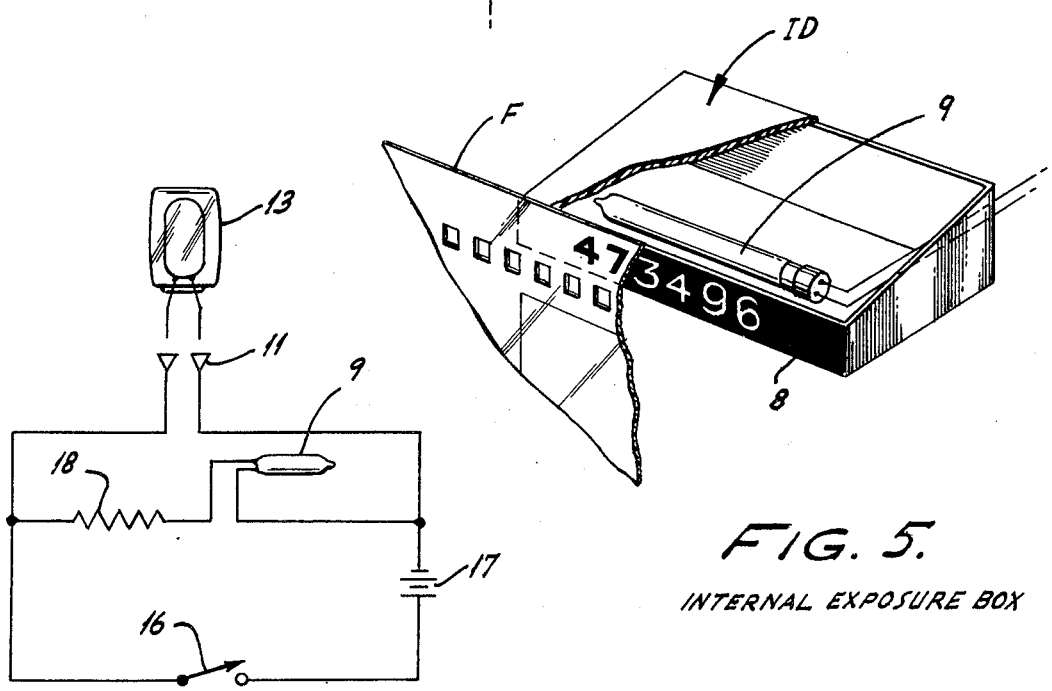
FIG. 5.
INTERNAL EXPOSURE BOX
FIG. 6.

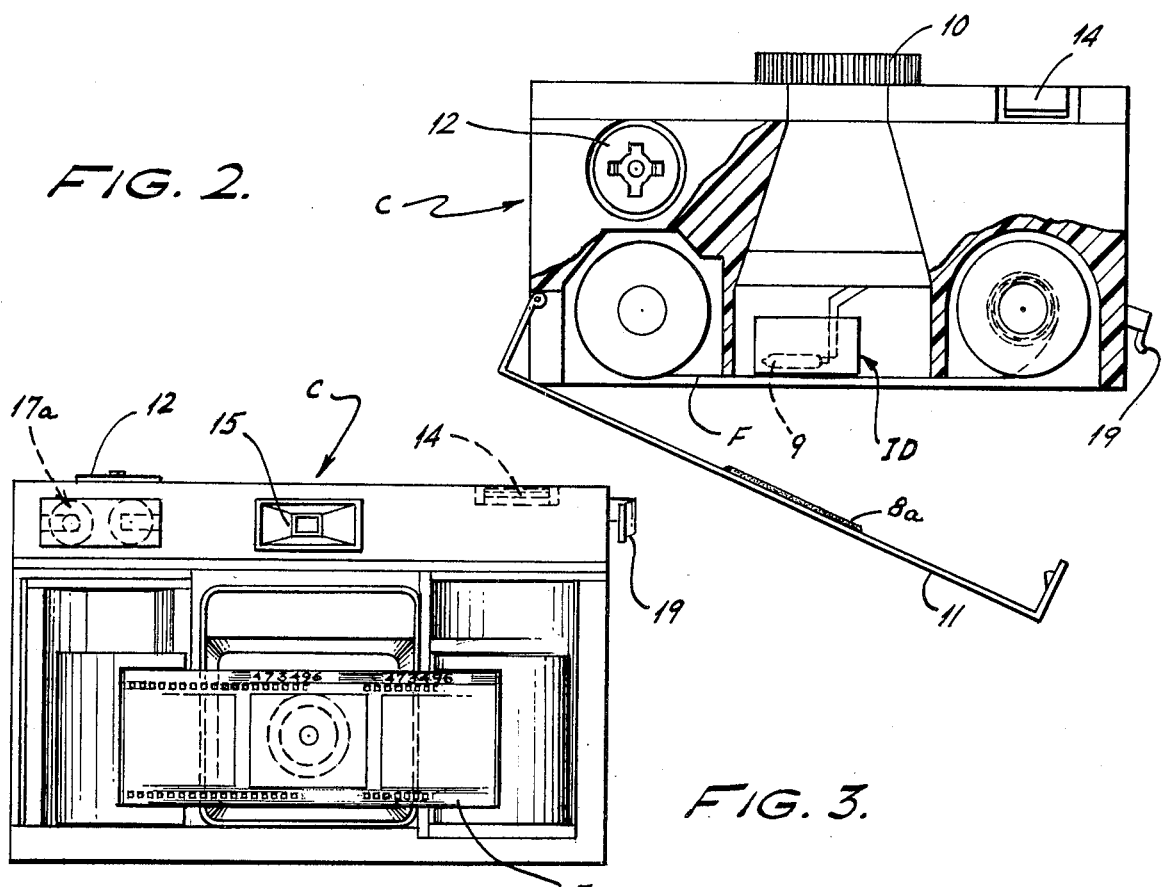
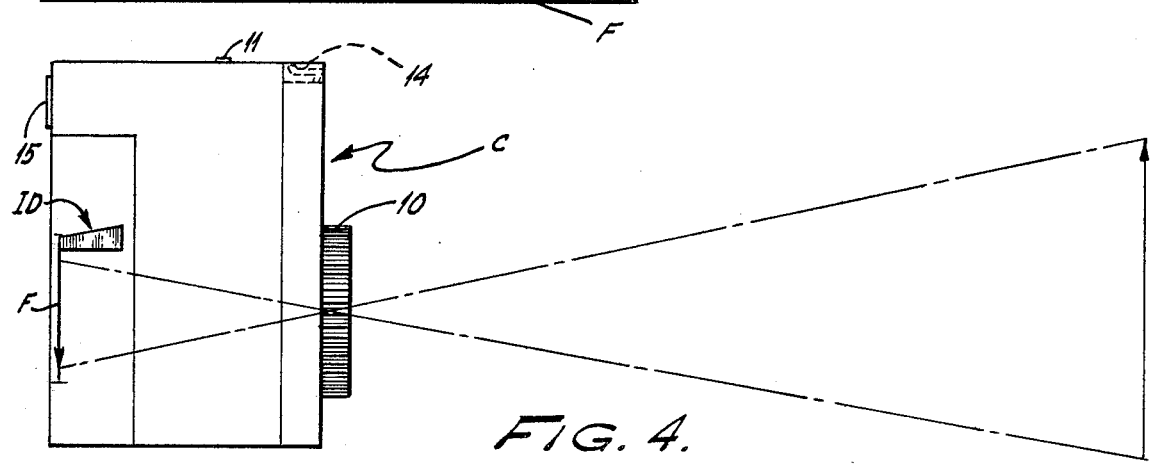
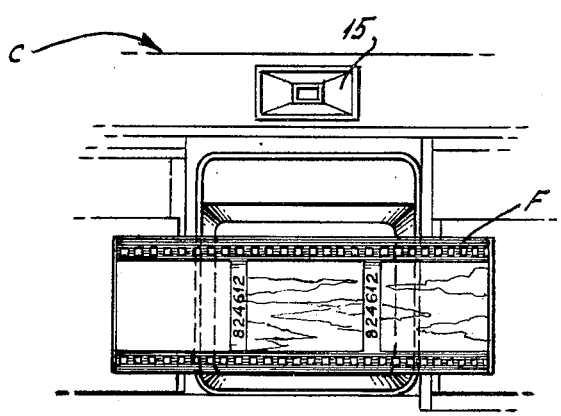

CAMERA AND FILM IDENTIFICATION SYSTEM

This invention relates to a camera and film identification system providing for exposure of distinctive identifying indicia on each slide, film or picture exposed in that individual camera.

BACKGROUND AND STATEMENT OF INVENTION

As is well known, the processing of films and the printing and reprinting thereof frequently results in loss of the information identifying the ownership of the film or films. This problem tends to become more acute when the processor is handling the films of many customers, and it is well known that as many as about 10% of the films or prints processed are either temporarily or permanently lost.

It is a primary objective of the present invention to provide a system according to which every individual photograph (negative, transparency or print) is marked with a distinctive identifying number or other indicia, which indicia are individualized insofar as each individual camera is concerned. According to the invention this is accomplished by exposure of such markings on the photograph when the picture is taken. In this way every individual film exposed in each camera will carry the identifying indicia distinctive to that camera, so that the ownership of that film can be determined by appropriate listings of the indicia together with the names of the owners of the cameras.

According to the invention it is contemplated that the exposure of the identifying indicia upon the film or photograph being taken is effected by means automatically operating under the influence of operation of the camera trigger. Still further, in a camera embodying a flash attachment, it is contemplated that the indicia exposing means be operated concurrently with the flash attachment, and preferably from the source of current provided for the flash attachment, whether or not a flash bulb or equivalent device is in use at the time any individual photograph is taken.

BRIEF DESCRIPTION OF THE DRAWINGS

How the foregoing and other objects and advantages are attained will appear more fully from the accompanying drawings illustrating preferred embodiments of the invention and in which -

FIG. 1 is a diagrammatic perspective view of the indicia exposure system contemplated by the invention;

FIG. 2 is a somewhat diagrammatic plan view, partly in section, of a camera structure adapted for film loading through a rear door, and incorporating the exposure device of the present invention;

FIG. 3 is a rear elevational view of the camera of FIG. 1, with the rear loading door removed;

FIG. 4 is a somewhat diagrammatic side elevational view of certain parts of the camera structure and of the indicia exposure device;

FIG. 5 is a perspective view of the indicia exposure device, a portion being broken away to show a lamp mounted within the device;

FIG. 6 is a schematic circuit diagram contemplated for use according to the present invention; and FIG. 7 is a fragmentary view similar to FIG. 3, illustrating an alternative location of the indicia exposure device.

DETAILED DESCRIPTION OF DRAWINGS

Referring first to FIG. 1, the lens system of the camera is indicated in outline at L and a film F is fed from a source of supply S, being taken up on the opposite side of the camera at T. Although the invention is applicable to cameras providing for individual loading of separate films or plates for individual photographs, in FIG. 1 and also in the other figures, the film is shown as supplied in roll form providing for a plurality of individual photographs or exposures, this system being the most commonly employed system. Such film rolls may either be provided with separately handleable supply and take up spools, or may be provided with interconnected structure forming a cartridge providing for the feed of the film from the supply source to the point of take up.

In any of the foregoing systems, a film or the like is positioned in an exposure zone appropriately positioned with respect to the lens system L so that the image of the subject to be photographed is projected on the film in the exposure zone as clearly indicated in FIG. 1. The camera shutter is then opened by the trigger normally provided so that the film at the exposure station is exposed, all in the well known manner.

According to the invention, in addition to the exposure of the image of the subject upon the film, identifying indicia is exposed on the film in a position adjacent to an edge of the exposure zone provided for the subject image. The identifying indicia may be exposed on the film adjacent to an edge of the exposure zone either just inside of or just outside of an edge line of said zone. In certain cartridge loading cameras, for instance in the cameras sold by the Kodak Company under the trademark Instamatic, the indicia may be conveniently exposed just inside of an edge line of the exposure zone. However, exposure of the indicia just outside of the normal exposure zone has the advantage that it does not intrude upon the picture being taken. Alternatively useable embodiments are illustrated in the drawings and are described hereinafter.

The identifying indicia may be exposed by means of a device generally indicated by ID which, in FIG. 1, is shown as positioned adjacent to the upper edge of the film F just above the upper edge of the exposure zone for the subject image, which zone is indicated in outline at Z in this figure. The device ID is also shown in FIG. 5 from which it may be seen that the device comprises an enclosed chamber, one wall 8 of which is positioned adjacent to the path of feed of the Film F, this wall being formed for example of a strip of acetate resin which is coated so as to be opaque except for areas in a pattern representing the identifying indicia. With the indicia areas transparent, and with a light source such as the neon lamp 9 located within the chamber ID, the film in the exposure zone will be exposed in a manner to record the identifying indicia upon the film. The wall or strip 8 may if desired be transparent and carry an opaque marking representing the identifying indicia. In either event, the contrast between light transmission and opaque areas of the wall 8 will provide the desired exposure of the indicia on the edge of the film.

Preferably, the wall or strip 8 is positioned so as to be in surface contact with the film, and this surface interengagement may, if desired, be assured by provision of a felt or similar backing pad behind the film in the region opposite the strip or wall 8, for instance on the loading door 11, as indicated at 8a in FIG. 2. This surface contact will avoid undesired light leakage into the interior of the camera. Although the wall 8 may be transparent and carry opaque indicia, the use of a wall 8 which is opaque, except for the areas representing the indicia, will aid in minimizing tendency for undesired light leakage, and this is therefore the preferred embodiment.

Referring now to FIGS. 2, 3 and 4, the camera structure is generally indicated by the letter C, the lens system as well as the shutter being adapted to be mounted by the structure indicated at 10. The film is again shown at F.

As above noted, the loading door of the camera is indicated at 11. The camera shown in these views is provided with a socket 12 for insertion of flash bulbs or the like, such as indicated at 13 in FIG. 6.

The trigger for the camera shutter is indicated at 14, and a viewing or siting device appears at 15.

As in known camera structures, it is contemplated that the shutter trigger 14 shall not only open the shutter to make the exposure, but will also actuate a switch such as diagrammatically indicated at 16 in FIG. 6. This switch is provided in a circuit connecting the source of current such as a battery indicated at 17 with leads extended to the socket 12 for the flash bulb 13. With this arrangement, actuation of the trigger 14 not only opens the shutter but also energizes the flash attachment.

According to the present invention the lamp 9 is also desirably connected in a circuit with the battery 17 and the switch 16, so that the lamp is also energized at the time the picture is taken, thereby effecting the exposure of the identifying indicia concurrently with the exposure of the subject image in the exposure zone of the film. It is contemplated that provision be made in the camera for mounting the battery 17 therein, for instance in the zone indicated at 17a in FIG. 3 which, as shown, will accommodate two cells.

Lamp 9 is advantageously a low powered lamp such as a neon lamp, and with such a device it may be desirable to include a resistance such as indicated at 18 in the lamp circuit.

From FIGS. 1 to 4 it may be seen that the device ID is located in the upper portion of the interior chamber or tunnel of the camera through which the image is projected from the lens to the film, thereby providing for exposing the marking indicia along the upper edge of the film.

Alternatively, as shown in FIG. 7, the device may be positioned adjacent a vertical edge of the exposure zone, thereby providing for exposure of the indicia in a strip along a vertical edge of the film or a picture being taken. In the case of a roll of film providing a sequence of pictures or exposures, the arrangement of FIG. 7 will provide for location of the identifying indicia in a narrow strip between adjacent frames on the film. However, the location of the indicia along the top or bottom of the film has the advantage that if the film is cut to separate individual exposures, minor misalignment of such cutting will not damage the indicia.

The enclosed chamber of the indicia exposure device ID may be formed as a separate unit and then assembled in the camera, preferably in the manufacturing operation, or the enclosed chamber may be formed as a cavity in some other portion of the camera structure.

In all cases it is preferred that the identification indicia be "built into" the camera structure at the time of its manufacture, so that the individual identification of each camera will be permanent and assured and so that a permanent record may be made of the identifying number or the like of each unit. In this way provision is made for permanent identification listings which may be used at any time to trace the ownership of any films being processed or reprinted.

The exposure of the identifying marking on negatives or other films which are processed in a manner separate from the handling of the camera itself facilitates tracing any lost films. In addition, the system of the invention is not only useful for such processing or reprinting of negatives, but in addition may even be employed advantageously in connection with the type of camera in which photographs are exposed and developed directly in association with the camera itself. The initial processing in such cameras is not subject to the problem of loss of identification, because the entire operation is effected by the photographer himself, but on occasions where it is desired to reproduce photographs of this type, such reproduction is advantageously effected in separate processing operations in which the photographer usually does not participate. The provision of the identifying indicia will serve to avoid loss in connection with such duplicating operations.

I claim:

1. A camera for photographically exposing film, the camera comprising means providing for stepwise feed of a film strip through an exposure zone from a supply to a take up reel to provide for sequential exposure of succeeding sections of the film strip and further comprising an exposure trigger, an enclosed chamber positioned in the camera between said reels in front of the exposure zone and having walls in predeterminedly fixed position with respect to each other and with one wall positioned to contact each film section along an edge thereof in the exposure zone, said one wall having permanently established portions of contrasting light transmission capability in the pattern of predeterminedly fixed distinctive camera ownership identifying indicia, the other walls of said enclosure being opaque, an electric lamp in said chamber having a current supply circuit, and a switch in said circuit operated by said exposure trigger thereby providing for exposure of each succeeding film section with the same distinctive camera ownership identifying indicia.

2. A camera for photographically exposing film, the camera comprising means providing for sequential feed of film sections through an exposure zone to provide for sequential exposure of succeeding film sections and further comprising an exposure trigger, an enclosed chamber having walls in predeterminedly fixed position with respect to each other and with one wall positioned to contact each film section along an edge of the exposure zone, said one wall having permanently established portions of contrasting light transmission capability in the pattern of predeterminedly fixed camera ownership identifying indicia, the other walls of said enclosure being opaque, an electric lamp in said chamber having a current supply circuit, and a switch in said circuit operated by said exposure trigger thereby providing for exposure of each succeeding film section with the same camera ownership identifying indicia.

3. A camera as defined in claim 2 in which said one wall of the enclosure is opaque except for the indicia which comprise light transmission areas in said opaque wall.

4. A camera for photographically exposing film, the camera comprising means providing for stepwise advance of a film strip from a supply source through a picture exposure zone to provide for sequential exposure of succeeeding sections of the film strip and further comprising an exposure trigger, an enclosed chamber having walls in predeterminedly fixed position with respect to each other and with one wall positioned to contact each film section in a position offset from the picture exposure zone along an edge thereof parallelling the direction of feed of the film strip, so that the picture exposure zones of the film strip are free of sliding contact with said one wall of the enclosure when the film strip is advanced, said one wall of the enclosure having permanently established portions of contrasting light transmission capability in the pattern of multiple character predeterminedly fixed camera ownership identifying indicia, the other walls of said enclosure being opaque, a single electric light source in said chamber providing for concurrent illumination of all of the characters of said indicia and having a current supply circuit, and a switch in said circuit operated by said trigger thereby providing for exposure of each succeeding film section with the same multiple camera ownership identifying indicia.

* * * * *